(No Model.) 2 Sheets—Sheet 1.
F. J. SPRAGUE.
ELECTRICAL PUMPING APPARATUS.
No. 385,211. Patented June 26, 1888.
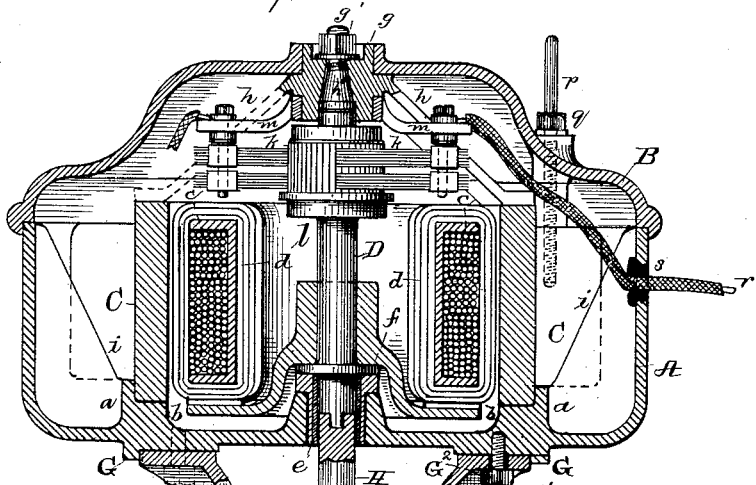
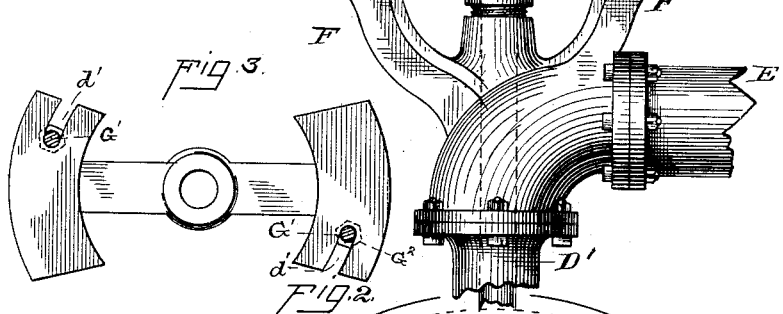
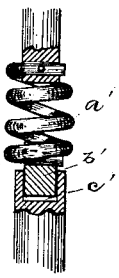
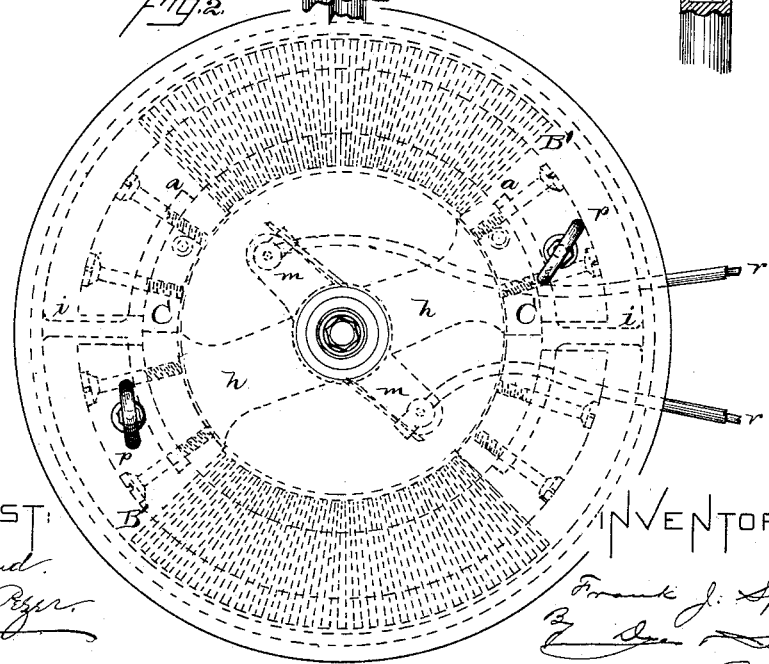
ATTEST: INVENTOR:

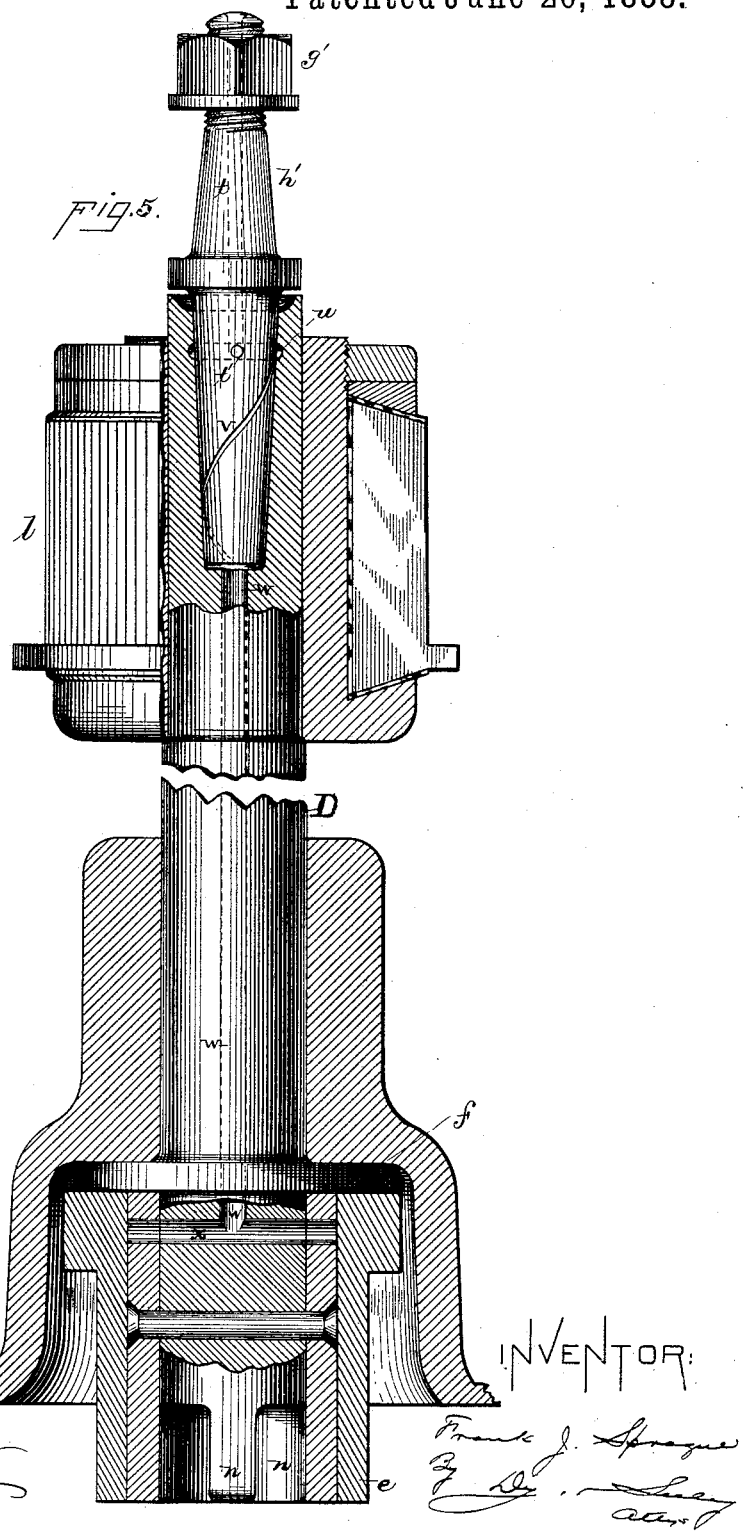

UNITED STATES PATENT OFFICE.

FRANK J. SPRAGUE, OF NEW YORK, N. Y.

ELECTRICAL PUMPING APPARATUS.

SPECIFICATION forming part of Letters Patent No. 385,211, dated June 26, 1888.

Application filed June 4, 1887. Serial No. 240,262. (No model.)

*To all whom it may concern:*

Be it known that I, FRANK J. SPRAGUE, of the city of New York, in the county and State of New York, have invented a certain new and useful Improvement in Electrical Pumping Apparatus, of which the following is a specification.

My invention relates to portable and separable rotary pumps and electric motors for operating them, designed principally for pumping out barges and other vessels, such as are set forth in the patent to Michales and Michaels, No. 358,053, dated February 22, 1887.

The object of my invention is to increase the convenience and effectiveness of such apparatus, the simplicity and compactness of construction of the motor, and the simplicity and efficiency of the connection of the motor to the pump; to efficiently protect the motor from rain and moisture, and to provide simple and efficient means for lubricating the bearings of the motor-shaft.

My invention consists in the novel devices and combinations of devices employed by me in accomplishing the above-named objects, as hereinafter set forth and claimed.

My invention is illustrated in the accompanying drawings, in which—

Figure 1 is a vertical section of the motor attached to the pump; Fig. 2, a top view of the same, the parts inside the cover being shown in dotted lines; Fig. 3, a view showing the mode of joining the motor-case to the pump; Fig. 4, a view showing another mode of joining the motor and pump shafts together; and Fig. 5, an enlarged section and partial elevation of the motor-shaft.

The motor is placed in a water-tight inclosing-case, consisting of a cylindrical box, A, closed at its bottom, except an aperture for the shaft, and a cover, B, fitting the case water-tight, and also having a shaft-aperture. This case is preferably made of bronze or any suitable non-magnetic metal or material. It may, however, be made of iron. The inside of the bottom of the case is formed or provided with two curved ribs, $a\ a$, concentric with the sides of the case, which support the field-magnet of the motor. The field-magnet is circular in form and concentric with the case, being composed of two semicircular cores, each wound with coils $B'\ B'$, while their ends are left bare, and have bolted to them the curved bars $C\ C$, which bars form the consequent poles of the magnet and rest on the shoulders $b$ of the ribs $a$. The armature-core is a circular ring, preferably made up of wires $c$ and wound with coils $d$, and such armature revolves in the circle of the field-magnet, being carried by the shaft D, which turns in bearings in the center of the case.

At the center of the bottom of the case is a flanged aperture, in which is placed a bushing, $e$, in which the shaft turns, the shaft having a flange, $f$, turning between said bushing and the armature-hub. At the top of the case there is an opening provided with a flanged bushing, $g$. Through this bushing, and held from turning by a locking-nut, $g'$, on the outside, is a stationary bearing-pin, $h'$, which enters the end of the shaft, (see Fig. 5,) and on which the shaft turns. The bushing being supported from the field-magnet, the bearing of the shaft is independent of the removable cover of the case. This support is by ribs $h\ h$, which extend and are attached to the curved pole-pieces $C\ C$. Strengthening-ribs $i\ i$ extend from the case to the supporting-ribs $a\ a$.

The commutator-brushes $k\ k$, bearing on the commutator-cylinder $l$, are supported by arms $m\ m$, extending from bushing $g$.

The use, as above described, of the circular case, field-magnet, and armature, all arranged concentrically, and the motor being held centrally in the case, provides a very compact and simple form of motor and one which is well protected from the weather. The cover B is removable without disturbing the motor and its connections, so that the cover can be taken off to inspect the motor while it is running, and the motor itself can be readily taken from the case for inspection or repair.

$D'$ represents the vertical tube, and E the discharge-pipe, of the rotary pump. From the bend of the pipe branching standards F extend upwardly for supporting the motor, and the motor-case has upon its bottom centering ribs or projections G, for guiding it into position.

The end of the motor-shaft within the bushing $e$ has cross-ribs $n\ n$, Fig. 5, and the pump-shaft H has corresponding cross-slots. I prefer, however, to employ instead of this a flexible connection, such as the spring-connection shown in Fig. 4. Here the motor-shaft has attached to it a heavy spiral spring, $a'$, the other end of which is joined to a square block, $b'$, and the pump-shaft has a squared recess, $c'$, which receives this block somewhat loosely, so that it can be readily placed therein. The power of the motor is thus communicated to the pump through the spring, and when the motor starts the whole load is not thrown suddenly upon it, but is placed upon it gradually.

The brackets at the top of standard F have each a curved slot, $d'$, at one end. The motor-case has fixed in its bottom part two bolts, $G'$.

When the pump is to be operated, it is first placed in position, and the motor-case is then placed upon the standards F, its position being determined by the centering-projections G, so that the cross-ribs and slots in the ends of the motor and pump shafts may be made to engage each other. The bolts $G'$ are made to enter the ends of the slots, the case being turned upon the standards to bring the parts into the right position, and nuts $G^2$ are then tightened upon the bolts to lock them.

The motor-case is provided with ring-bolts $p\ p$, passing through the cover and held by nuts $q$ and screwed into the magnet-cores, whereby the motor may be lifted to carry it from place to place. The conductors $r$ of the circuit leading to the motor preferably enter the case through a rubber or other water-tight bushing, $s$. When the motor is thus inclosed in the water-tight case, it is difficult or impossible to reach the bearings to lubricate them. I therefore provide the arrangement shown in Fig. 5.

The stationary bearing-pin $h'$ has a longitudinal hole, $t$, (shown in dotted lines,) extending in to the part of said pin surrounded by the shaft, and from the end of said hole a cross-aperture, $t'$, extends to the outside of the pin, and at this point the shaft has a channel, $u$. From this point the exterior of the pin has a spiral groove, $v$, on its surface extending to its lower end. The shaft D (part of which is broken away in the drawings) has a hole, $w$, extending through it longitudinally to within its lower bearing-surface, where a connected transverse aperture, $x$, extends across the shaft. To lubricate the shaft-bearings, oil is admitted at the upper end of the bearing-pin $h'$ and flows through the holes $t$ and $t'$ and spiral groove $v$, whereby the bearing-surface is lubricated at this end. Then the oil flows through the aperture $w$ and cross-aperture $x$ of the shaft, and thus reaches and lubricates the bearings at the lower end thereof.

What I claim is—

1. The combination of a circular inclosing-case, a shaft passing vertically through the center of said case, a circular armature on said shaft, and a circular field-magnet resting on the bottom of said case, substantially as set forth.

2. The combination of an electric motor, a case inclosing said motor, a removable cover for said case, and bearings for the motor-shaft supported from the case and independent of the cover, substantially as set forth.

3. The combination of an inclosing-case having a removable cover, and an electric motor in said case having a vertically-placed armature with its upper shaft-bearing independent of the cover, substantially as set forth.

4. The combination of a shaft and a journal inclosing and supporting said shaft, said shaft having a cross-aperture within said journal, an opening for the admission of oil, and a longitudinal bore or aperture extending continuously from said opening to said cross-aperture, substantially as set forth.

5. The combination of a vertically-placed shaft and a journal inclosing said shaft at its lower end, said shaft having a longitudinal bore or aperture extending continuously from its upper end to a point within said journal, where there is a communicating cross-aperture, substantially as set forth.

6. The combination of the inclosing-case, the shaft passing vertically through said case, the bearing-pin in the top of the case entering the end of the shaft, and bearings for the shaft in the lower side of the case, said bearing-pin having a longitudinal aperture extending from its top, a communicating cross-aperture extending to its bearing-surface, and said shaft having a longitudinal bore or aperture extending from its upper end and a cross-aperture at its lower bearing, substantially as set forth.

7. The combination of a pump and a case inclosing an electric motor detachably connected with said pump, said case having guiding projections on its bottom for determining its position on the pump, substantially as set forth.

8. The combination of a rotary pump provided with upwardly-projecting standards and a shaft extending vertically up from said pump, with an inclosing-case, an electric motor placed vertically therein, means for securing said case upon said standards, and means for connecting the pump-shaft with the motor-shaft, substantially as set forth.

9. The circular field-magnet consisting of two semicircular cores wound with wire coils and curved bars secured to the ends of said cores on each side, substantially as set forth.

10. The combination of a separable motor and pump and a spring-connection between their shafts, substantially as set forth.

This specification signed and witnessed this 26th day of May, 1887.

FRANK J. SPRAGUE.

Witnesses:
S. D. GREENE,
FREMONT WILSON.